June 10, 1930.  S. BOLIN  1,762,955

COVER FOR VEHICLE SPRINGS

Filed Nov. 29, 1926

Witness:
A. Burkhardt

Inventor:
Stanley Bolin,
By Cromwell, Greist & Warden
Attys

Patented June 10, 1930

1,762,955

UNITED STATES PATENT OFFICE

STANLEY BOLIN, OF CHICAGO, ILLINOIS, ASSIGNOR OF ONE-HALF TO LEONARD M. BOLIN, OF CHICAGO, ILLINOIS

COVER FOR VEHICLE SPRINGS

Application filed November 29, 1926. Serial No. 151,274.

This invention pertains to vehicle spring covers, and has for its object the provision of an improved cover which effectively encloses the spring without in any way interfering with the action thereof, which is inexpensive to manufacture, and which may be quickly applied to or removed from the spring without the use of tools.

While the foregoing is indicative in a general way of the nature of the invention, other objects and advantages will be apparent to those skilled in the art upon a full understanding of the improved cover.

For the purpose of exemplification, two slightly different structural forms of the invention are presented herein, but it will of course be appreciated that the invention is susceptible of embodiment in other slightly modified forms coming equally within the scope of the appended claims.

Figure 1:
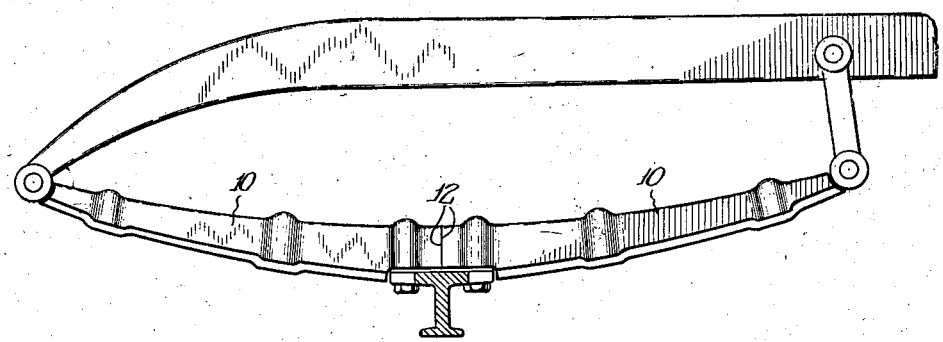
Fig. 1 is a side view of a vehicle spring, covered in accordance with the invention.

It will be observed in the drawing that the spring cover of the invention is a casing 10 which envelops one half of a vehicle spring 11 and is used in conjunction with a similar casing which envelops the other half of the spring, the two casings being arranged complementarily with their adjacent ends 12 in abutting relation.

The casing 10 is made of soft rubber, and tends under its own resiliency to assume a closely fitting position about the spring at all times. The casing is open at both ends, and is provided with a longitudinally extending slit 13, preferably along the bottom thereof, which slit, while normally closed, may be temporarily spread open in applying the casing to, or removing it from, the spring.

Figure 2:
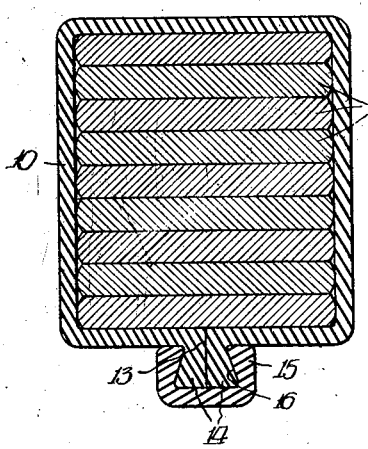
Fig. 2 is a transverse section through the spring and cover.
Figure 3:
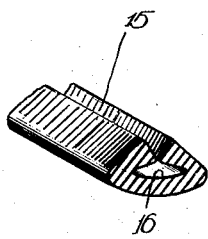
Fig. 3 is a fragmentary perspective view of the fastening strip.

In the form of the invention illustrated in Figs. 1, 2 and 3 of the drawing, the casing is provided along the edges of the slit 13 with two longitudinally extending ribs 14, which ribs project downwardly from the bottom of the casing in contiguous association with each other and are so shaped as to present together a wedge-shaped formation of downwardly increasing cross-sectional area.

The ribs 14 are clamped together by the application thereto of a longitudinally grooved strip 15, which is also made of soft rubber. The groove 16 in the strip is of the same wedge-shaped cross-sectional area as the formation presented by the ribs 14, after application thereto, and presents therewith a dove-tailed joint which effectively serves to maintain the slit 13 in the casing closed. The strip 15 is so formed that the sides of the grooves therein will spring almost together when not held in separate relation by the ribs. The strip may be readily applied to or removed from the casing by forcing it over the ribs 14, commencing at one end of the strip and working progressively toward the other, the ribs and the sides of the strip yielding resiliently to an extent sufficient to permit such application or removal. After the strip has been applied, any tendency of the casing to open up at any point throughout the length thereof under the action of the spring only serves to lock the strip 15 more tightly against the ribs on the casing, and it is very difficult, if not practically impossible, to pull the strip downwardly out of engagement with the ribs at any point intermediate the length thereof.

Figure 4:
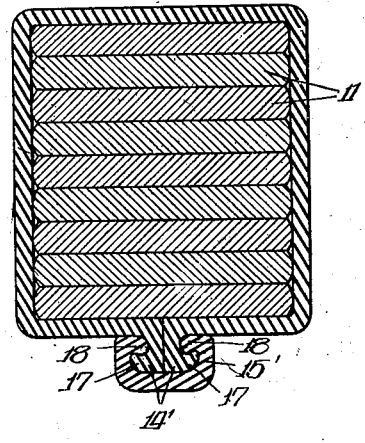
Fig. 4 is a transverse section, corresponding to Fig. 2, but showing a slightly modified connection between the casing and the fastening strip.
Figure 5:
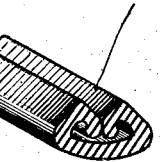
Fig. 5 is a fragmentary perspective view of the fastening strip shown in Fig. 4.

In Figs. 4 and 5 of the drawing is shown a modification in the cross-sectional shape of the joint between the ribs 14' of the casing and the strip 15'. Instead of the contacting faces of the ribs and strip being inclined, the lower outer edges of the ribs are provided with outwardly extending beads 17, and the upper inner edges of the strip are provided with inwardly extending beads 18 which hook inwardly over the beads 17 on the ribs. This modified shaping of the cooperating rib and strip portions produces an even tighter joint between such elements.

Figure 6:
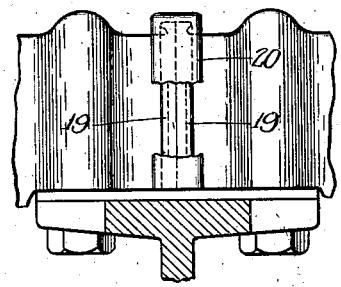
Fig. 6 is a fragmentary side view, corresponding to the central portion of Fig. 1, but showing the abutting ends of two covers secured together by an additional fastening strip.

In Fig. 6 is shown a modification in the abutting ends of the two casings on the spring. The abutting ends are provided with outwardly extending ribs 19 of the same cross-sectional shape as those along the longitudinally extending slits in the bottoms of the casings, and such ribs are fastened together, in the same manner as the ribs 14' are fastened by the strip 15', by the application thereto of a grooved strip 20.

I claim:

1. A spring cover, comprising a longitudinally slitted casing of soft rubber having ribs along the edges of the slit, and a longitudinally grooved strip of soft rubber adapted to fit over and embrace the ribs.

2. A spring cover, comprising a longitudinally slitted casing having ribs along the edges of the slit, and a longitudinally grooved imperforate sealing strip of soft rubber adapted to fit over and embrace the ribs.

3. A spring cover, comprising a longitudinally slitted casing having ribs along the edges of the slit, and a longitudinally grooved strip adapted to fit over and embrace the ribs, the interfitting rib and strip portions being formed of readily flexible material in order to conform to the flexing of the spring and being of such cross-sectional area as to present an interlocking dove-tailed joint therebetween, and certain of such portions being of soft rubber.

4. A spring cover, comprising a longitudinally slitted casing having ribs along the edges of the slit, and a longitudinally grooved strip adapted to fit over and embrace the ribs, the interfitting rib and strip portions being formed of readily flexible material in order to conform to the flexing of the spring and being of such cross-sectional area as to present an interlocking dove-tailed joint therebetween, and certain of such portions being resiliently yieldable whereby to permit assembling and disassembling of the same.

In testimony whereof I have hereunto subscribed my name.

STANLEY BOLIN.